United States Patent
Anand et al.

(10) Patent No.: US 10,552,390 B2
(45) Date of Patent: *Feb. 4, 2020

(54) ROOT CAUSE ANALYSIS OF PERFORMANCE PROBLEMS

(71) Applicant: INTERNATIONAL BUSINESS MACHINES CORPORATION, Armonk, NY (US)

(72) Inventors: Manish Anand, Irving, TX (US); Pathan Niyazulla Khan, Bangalore (IN); Sweta Singh, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 493 days.

This patent is subject to a terminal disclaimer.

(21) Appl. No.: 15/400,048

(22) Filed: Jan. 6, 2017

(65) Prior Publication Data
US 2018/0196835 A1 Jul. 12, 2018

(51) Int. Cl.
*G06F 17/30* (2006.01)
*G06F 16/21* (2019.01)
*G06F 11/34* (2006.01)

(52) U.S. Cl.
CPC ........ *G06F 16/217* (2019.01); *G06F 11/3409* (2013.01)

(58) Field of Classification Search
None
See application file for complete search history.

(56) References Cited

U.S. PATENT DOCUMENTS

| | | | |
|---|---|---|---|
| 6,542,905 B1* | 4/2003 | Fogel | G06Q 10/06 |
| 8,108,350 B2 | 1/2012 | Rohwedder et al. | |
| 8,347,148 B1 | 1/2013 | Harrison et al. | |
| 8,788,527 B1 | 7/2014 | Nadel et al. | |
| 8,887,009 B1 | 11/2014 | Harrison et al. | |
| 9,439,081 B1 | 9/2016 | Knebl et al. | |
| 10,210,189 B2* | 2/2019 | Anand | G06F 11/3409 |

(Continued)

OTHER PUBLICATIONS

McGehee, "Correlating SQL Server Profiler with Performance Monitor," Simple-Talk.com, Feb. 16, 2011, https://www.simple-talk.com/sql/database-administration/correlating-sql-server-profiler-with-performance-monitor/, pp. 1-26, Printed on Jan. 14, 2016.

(Continued)

*Primary Examiner* — Tung S Lau
(74) *Attorney, Agent, or Firm* — Dmitry Paskalov

(57) ABSTRACT

A method, computer program product, and system for analyzing performance of a computer system where at a plurality of time intervals, a set of KPIs of a database and database performance outputs are monitored. A database performance value is calculated based on the monitored KPIs and one or more database performance outputs. In response to determining the database performance value is below a first threshold, a KPI correlation coefficient is calculated. The calculated KPI correlation coefficient with the greatest value is selected as a target KPI. In response to determining that a count of functions of the target KPI meets a second threshold, a dynamic tabular representation of the determined target KPI is generated. A correlation matrix is generated based on the generated tabular representation and the plurality of time intervals and a first set of target functions are identified based on the generated correlation matrix.

20 Claims, 5 Drawing Sheets

(56) References Cited

U.S. PATENT DOCUMENTS

| | | | |
|---|---|---|---|
| 2009/0240644 A1* | 9/2009 | Boettcher | H04L 41/142 706/47 |
| 2012/0102060 A1* | 4/2012 | Kulkarni | G06F 16/2453 707/769 |
| 2012/0131591 A1* | 5/2012 | Moorthi | G06Q 10/06 718/104 |
| 2013/0166702 A1* | 6/2013 | Sasatani | H04L 29/08981 709/220 |
| 2013/0297587 A1* | 11/2013 | Singh | G06F 16/2453 707/719 |
| 2014/0336984 A1 | 11/2014 | Starr | |
| 2015/0039555 A1 | 2/2015 | Rao | |
| 2015/0094989 A1* | 4/2015 | Collet | G01L 19/0092 702/188 |
| 2015/0199224 A1* | 7/2015 | Mihnev | H04L 43/045 714/37 |
| 2015/0347953 A1 | 12/2015 | Saito et al. | |
| 2016/0034305 A1* | 2/2016 | Shear | G06F 16/245 707/722 |
| 2016/0103888 A1 | 4/2016 | Fletcher et al. | |
| 2016/0104076 A1 | 4/2016 | Maheshwari et al. | |
| 2016/0171414 A1 | 6/2016 | Lee | |
| 2018/0196837 A1* | 7/2018 | Anand | G06F 16/217 |

OTHER PUBLICATIONS

IBM: List of IBM Patents or Patent Applications Treated as Related (Appendix P), Feb. 28, 2018, 2 pages.
Pending U.S. Appl. No. 15/907,353, filed Feb. 28, 2018, entitled: "Root Cause Analysis of Performance Problems", 31 pages.

* cited by examiner

ROOT CAUSE ANALYSIS OF
PERFORMANCE PROBLEMS

BACKGROUND

The present invention relates generally to the field of data monitoring, and more particularly to the statistical analysis of variables to extract correlations in data.

IT monitoring products continuously monitor data, store it in repositories, categorize and present the collected metrics in graphical dashboards. However, symptoms to low performance may be elusive. This makes it very difficult for administrators to efficiently perform quick root cause analysis of performance issues. Resolving performance issues is a big challenge as they are mostly ad-hoc in nature. Performance investigation time may be spent in determining what the cause of the performance issue is. The need to go through data/metrics and manually correlate the symptoms to periods of good vs bad performance may be time consuming.

A particular challenge come when analyzing SQL executions, processes, or functions, which contribute to the bad performance. As many SQLs are executed per a particular monitoring interval, it can become exceedingly difficult to determine which SQLs/pattern of SQLs are executing inefficiently, or deviating from their average execution time, during periods of bad performance. It may be advantageous to determine which SQLs have the strongest correlation to database performance, or which SQLs have the greatest impact on a reduction in performance. The complexity increases when such analysis is being done across several intervals to reliably identify candidates for SQL tuning.

SUMMARY

Embodiments of the present invention disclose a method, computer program product, and system for analyzing performance of a computer system based on system or database level key performance indicators (KPIs). At a plurality of time intervals, a set of KPIs and database performance outputs of a database are monitored, wherein a KPI is associated with the execution of one or more functions. A database performance value is calculated based on the monitored KPIs and one or more database performance outputs. In response to determining the database performance value is below a first threshold, a KPI correlation coefficient is calculated, representing a correlation between the set of KPIs and corresponding database performance values. The calculated KPI correlation coefficient with the greatest value is selected as a target KPI. In response to determining that a count of functions of the target KPI meets a second threshold, a dynamic tabular representation of the determined target KPI is generated, wherein the columns represent KPIs and the rows represent function. A correlation matrix is generated based on the generated tabular representation and the plurality of time intervals and a first set of target functions, associated with the correlation coefficient with the greatest value, are identified based on the generated correlation matrix.

DETAILED DESCRIPTION

Figure 1:
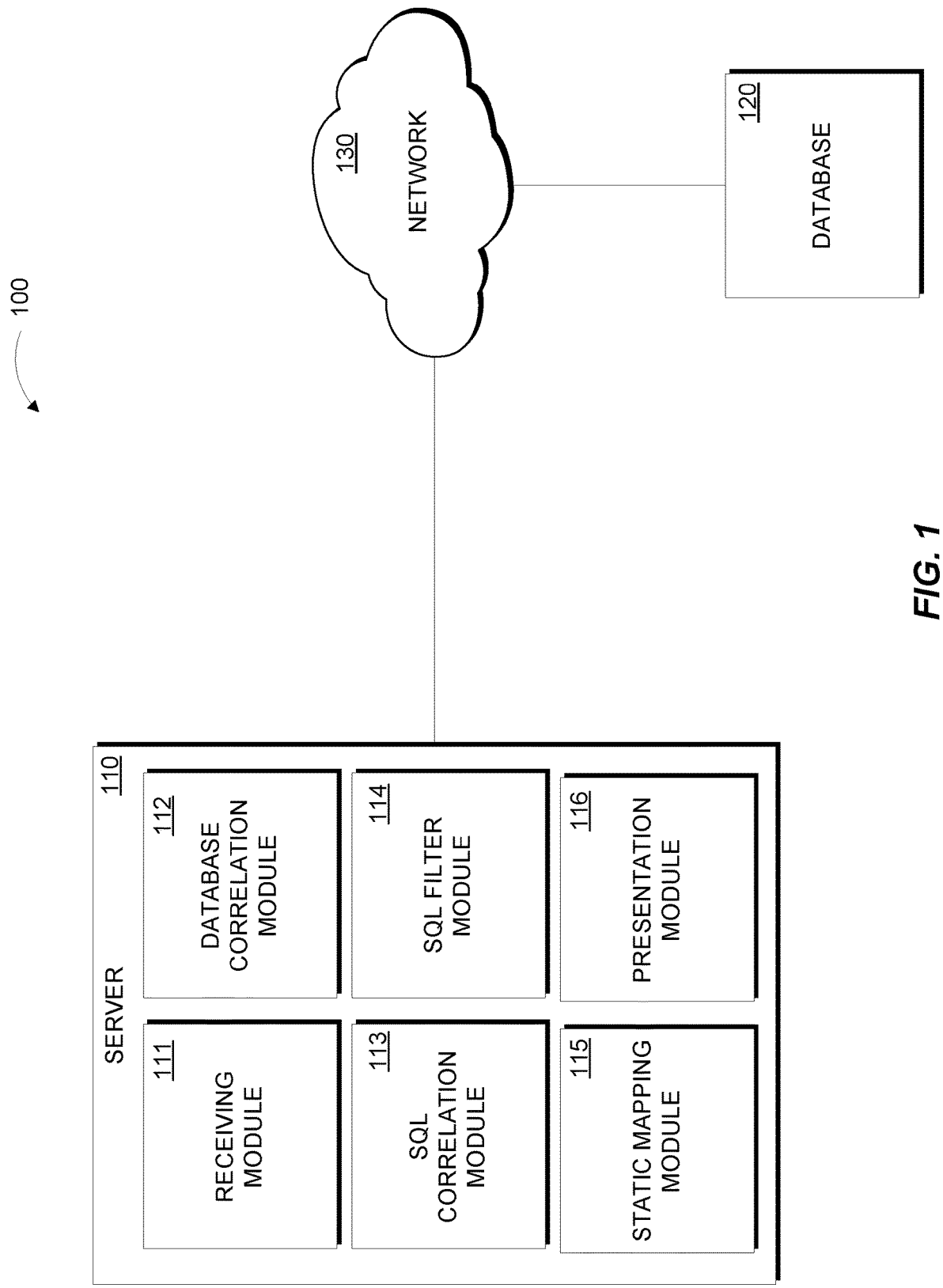
FIG. 1 is a functional block diagram illustrating a distributed data processing environment, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

In various embodiments of the present invention, a method, computer program product, and system is provided for analyzing the performance of a computer system, server, or database based key performance indicators (KPIs). KPIs may be a collection of calculations, or functions, which may be analyzed in order to provide information on how a client or server is performing. At periodic time intervals a plurality of KPIs may be monitored, wherein the period of the time intervals may be predetermined, determined by performance changes in the monitored system, or calculated by metrics. Along with monitored KPIs, the performance of the server is also monitored. These server performance outputs may be, for example, network bandwidth use, computer processor resource use, memory resource use, disk use, or other any other resource determines by an administrator.

As mentioned above, KPIs may be a collection of functions therefore, in various embodiments of the present invention, KPIs may be associated with the executions of the functions contained therein. A database performance value may be calculated based the monitored KPIs and on one or more database performance outputs monitored in a particular time interval in interest. A database performance value may be determined based on a database performance correlation for one or more KPIs in a set of KPIs based on a difference between the performance of the one or more KPIs in the set of KPIs and a statistical model.

In various embodiments, a time interval of interest may be associated with a determination that the calculated database performance value crosses a threshold. The threshold, for example, may be predetermined as any value in which an administrator assigns a performance preference to the threshold value, meaning performance below such threshold may indicated the need for root cause analysis of the performance. In various embodiments, the database performance value is below a threshold, above a threshold, or is equal to a threshold. For example a threshold indicating a drop in performance, a threshold indicating an increase in the time it takes for the execution of a function to take place, or performance being equal to a variety of thresholds are valid. In various embodiments, the threshold may be a change in database performance of indicating a performance issue, therefore, the threshold may be a delta in the performance from the preceding time interval to the subsequent time interval.

In various embodiments, in response to the calculated database performance value being below a threshold, a KPI correlation coefficient representing a correlation between the set of KPIs and corresponding database performance values may be calculated. The correlation coefficients may be calculated for one or more of the monitored KPIs or a predetermined number of KPIs. In various embodiments, the monitored KPIs may be filtered to decrease the number of analyzed KPIs or to increase the efficiency of the analysis. In various embodiments, the correlation coefficient, or linear dependence measurement between the KPIs and database performance value may be calculated as the Pearson product-moment (Pearson's) correlation coefficient of the KPIs.

In various embodiments a weighted coefficient vector may be calculated or predetermined by a user, to represent an "importance value" of varying KPIs to a user. The weighted correlation builds upon the Pearson's coefficient. By only using the raw Pearson's calculated correlation coefficient, undesired KPIs may be targeted. In various embodiments, a time spent per function performance metrics or time spent metrics may be used, where the relative time spent in the area of function execution, or calculation, with respect to the total executions or calculations performed by the during a particular time interval is determined and may be calculated as the weight of the coefficient. Therefore the target KPI or target function within the KPI with the highest weighted coefficient may be advantageous. For example, a selected KPI, "A", with a correlation coefficient of 0.9, representing 0.2% of the total change in performance, would have a lower weighted correlation coefficient that a selected KPI "B" with a correlation coefficient of 0.6, but representing 20% of the total change in performance. Using weighted correlation may be advantageous to eliminate seemingly top correlated KPIs that may be highly correlative but have a small impact on the overall database performance. Weighted correlation coefficients may also be advantageous to distinguish KPIs with coefficients statistically similar to one another.

In various embodiments, the KPI correlation coefficient with the greatest value, or highest vector gradient, may be selected. The KPI associated with the selected coefficient may be the target KPI. In various embodiments, one or more KPIs may be target KPIs, the target KPI being the one or more indicators that may be affecting the performance of the database.

The target KPI(s) may contain a plurality of functions or SQLs. In response to determining a count of functions, or a value representing the number of functions of the plurality of functions contained within, or associated with, the target KPI(s) meets a second threshold, a dynamic tabular representation of the target KPI is generated. The tabular representation of the target KPI may contain columns, representing KPIs, and rows, representing functions or SQLs. In various embodiments, the columns and rows of the generated tabular representation may contain column label(s) based on the target KPI(s) and rows labels based on the one or more functions of the target KPI. A correlation matrix may be generated based on the generated tabular representation and the plurality of time intervals.

In various embodiments, the correlation matrix may be generated by mapping the one or more SQLs or functions of the target KPI and a corresponding time interval in which the one or more functions were executed and calculating the Pearson's correlation coefficient for the one or more mapped functions. A first set of target functions are identified where the target functions are the functions with the greatest correlation coefficients, based on the correlation matrix. The target functions may be labeled "bottlenecks". A target function associated with a bottleneck identification may indicate a potential source of performance impact where the target function, or bottleneck, may be identified during as the root cause of performance degradation during the root cause analysis (RCA) and the bottleneck SQL may be communicated to a user along with a next best action (NBA) recommendation. The next best action may include alternative function that may have less of an impact on performance or textual recommendation laying out instructions to circumvent the bottleneck.

In various embodiments, the process of selecting a target KPI may comprise of calculating a database performance value based on the monitored KPIs and one or more database performance outputs, and in response to determining the database performance value is below a threshold, calculating a KPI correlation coefficient or weighted correlation coefficient, wherein the correlation coefficient represents a correlation between the set of KPIs and corresponding database performance values.

In various embodiments, the correlation matrix may be generated via various functions, for example, a JOIN function. In additional embodiments, for a particular time interval, the tabular representation may be generated via an INSERT statement based on function identification values. Functions may be identified by any means known in the art. A second tabular representation may be generated based on the above tabular representation, monitored KPIs, and a time stamp via a JOIN function. Correlation coefficients or weighted correlation coefficients may be calculated as described above and functions may be ranked to determine the one or more target functions or bottlenecks.

In various embodiments of the present invention, a plurality of time spent per KPI is received and filtered to eliminate collinearity with received database performance output. A first time spent per transaction value for each KPI of the KPIs is determined. A correlation coefficient between received KPIs and database performance outputs is calculated. A weight coefficient modifying value is determined for KPIs with associated correlation coefficients greater than a threshold. One or more function identification numbers representing multiple functions executed on the database within a time interval is determined. A subset of function identification numbers is generated of the one or more functions, the subset of function identification number based on function that contribute a predetermined threshold of overall database resource use or activity. Correlation coefficients between functions and database performance are determined. Weighted correlation coefficients for functions with correlation coefficients greater than predefined threshold are calculated. Functions are listed, sorted based on their weighted correlation coefficients, and the top functions above a threshold are communicated. The KPIs and communicated functions are mapped with "resource bottleneck" labels and a received Next Best Action (NBA) is communicated to a user. The NBA may be a listing of recommendations to resolve the KPIs and functions labeled as bottlenecks.

The present invention will now be described in detail with reference to the Figures. FIG. 1 is a functional block diagram illustrating a distributed data processing environment, generally designated 100, in accordance with one embodiment of the present invention.

Distributed data processing environment 100 includes server 110 and database 120, all interconnected over network 130. Server 110 and database 120 may be a laptop computer, tablet computer, netbook computer, personal computer (PC), a desktop computer, a smart phone, or any programmable electronic device capable of communicating via network.

Network 130 can be, for example, a local area network (LAN), a wide area network (WAN) such as the Internet, or a combination of the two, and can include wired, wireless, or fiber optic connections. In general, network 130 can be any combination of connections and protocols that will support communications between server 110 and database 120.

Database 120 may act generally to store monitoring data, for example, SQL data and associated performance metadata, or key performance indicators (KPI) including, for example, time spent in different operations like lock, I/O, network at the database level and SQL level. Server 110 may query database 120 for sets of data and associated metadata. Database 120 may communicate queried data to server 110.

Server 110 may act generally to receive monitoring data or KPIs from database 120, and perform statistical analysis on received data in order to determine the top performance bottleneck, the contributing SQLs and Next Best Actions (NBA). Server 110 includes receiving module 111, database correlation module 112, SQL correlation module 113, SQL filter module 114, a static mapping module 115 and presentation module 116. Server 110 and database 120 may include internal and external hardware components, as depicted and described in further detail with respect to FIG. 5.

Receiving module 111 may act generally to receive monitoring data from database 120. Receiving module 111 may filter received database level time spent KPIs within a predetermined time period. This may reduce collinearity. Receiving module 111 may normalize the database level KPIs based on number of transactions per monitoring interval and communicate the KPIs to database correlation module 112.

Database correlation module 112 may calculate correlation between time spent KPIs and database performance. Database performance is the total time spent in database per transaction. Database correlation module 112 may filter KPIs with correlation coefficient less than a predetermined threshold. Database correlation module 112 may end the process if all KPIs are below a threshold. For example, all KPIs below a threshold would suggest that there may not be much variation in database performance during the specified time interval and therefore, strong enough correlations could not be established between the KPIs and database performance. Database correlation module 112 may assign weights to the computed correlations. For example, raw coefficients may lead to wrong inferences or wrong priorities and "weights" may be advantageous in the root cause analysis. In various embodiments, performance metrics may be time spent metrics, and the relative time spent in a database area with respect to the total database time may serves as the ratio to calculate the weight for the coefficient. The product of raw Pearson's coefficients and the percentage time spent in the database area serves as the Weighted Correlation and the KPI having the highest weighted correlation is the target KPI. Weighted correlation is particularly advantageous in eliminating irrelevant KPIs that show very high correlation but whose relative contribution to database performance is negligible. Weighted correlations may also serves as a tiebreaker for two correlation coefficients that are statistically similar. In various embodiments, it is advantageous to have ranked target KPIs with associated correlation coefficients with a difference above a predetermined value, in order to aid in RCA automation. Database correlation module 112 may communicate the identified database level KPI to SQL correlation module 113.

SQL correlation module 113 may act generally to construct tabular representations, or tables, in order to determine which functions or SQLs impact performance. SQL correlation module 113 may receive data from database correlation module 112 and generate a table based on received data. SQL correlation module 113 may determine distinct SQL IDs executed in the specified time interval associated with the target KPI. SQL correlation module 113 may invoke SQL filter module 114 if the number of SQLs is greater than a predefined threshold. SQL correlation module 113 may construct a table with the filtered SQL IDs as columns and the identified KPI value at the SQL level for every time interval as a row. A value of 0 may be used to represent a time interval where an SQL is not executed. SQL correlation module 113 may use a JOIN function on the generated table with the database level KPI identified by database correlation module 112, or target KPI, based on a timestamp. The resultant table can then be used to calculate correlations between the SQL KPI and database level KPI. Further, similar to database correlation module 112, weights are computed for SQLs based on the relative time spent performing the SQL in the target KPI with respect to the total time the target KPI needed to execute the SQLs contained in the target KPI. The product of raw Pearson's coefficient and the percentage time spent in the SQL serves as the Weighted Correlation. SQL correlation module 113 may sort the SQLs and communicate the database level KPI and top SQLs to presentation module 116.

SQL filter module 114 may act generally to receive tabular data from SQL correlation module 113 and generate a shortened or filtered list of SQL IDs. For example, for a given time interval, SQLs are sorted by the time spent and SQLs are admitted until 80% of the total time of the target KPI in each time interval is accounted for.

Static mapping module 115 creates a map between target KPI and target SQLs or "bottlenecks" and maps between the target KPI and a Next Best Action (NBA) as described above. In various embodiments the NBA may provide additional or alternative methods or tuning recommendations that may resolve or circumvent the bottleneck.

Presentation module 116 receives inputs from SQL correlation module 113 and static mapping module 115. Presentation module 116 may act generally to map the identified database level KPI to a bottleneck type and Next Best Action. Presentation module 116 may generate a graphical representation of the received data for display to a user. Presentation module 116 may display the Root Cause Analysis comprising of bottleneck, top SQLs and Next Best Analysis to the end user or receive input from a user to modify the graphical representation based on the user input via a user device.

Figure 2:
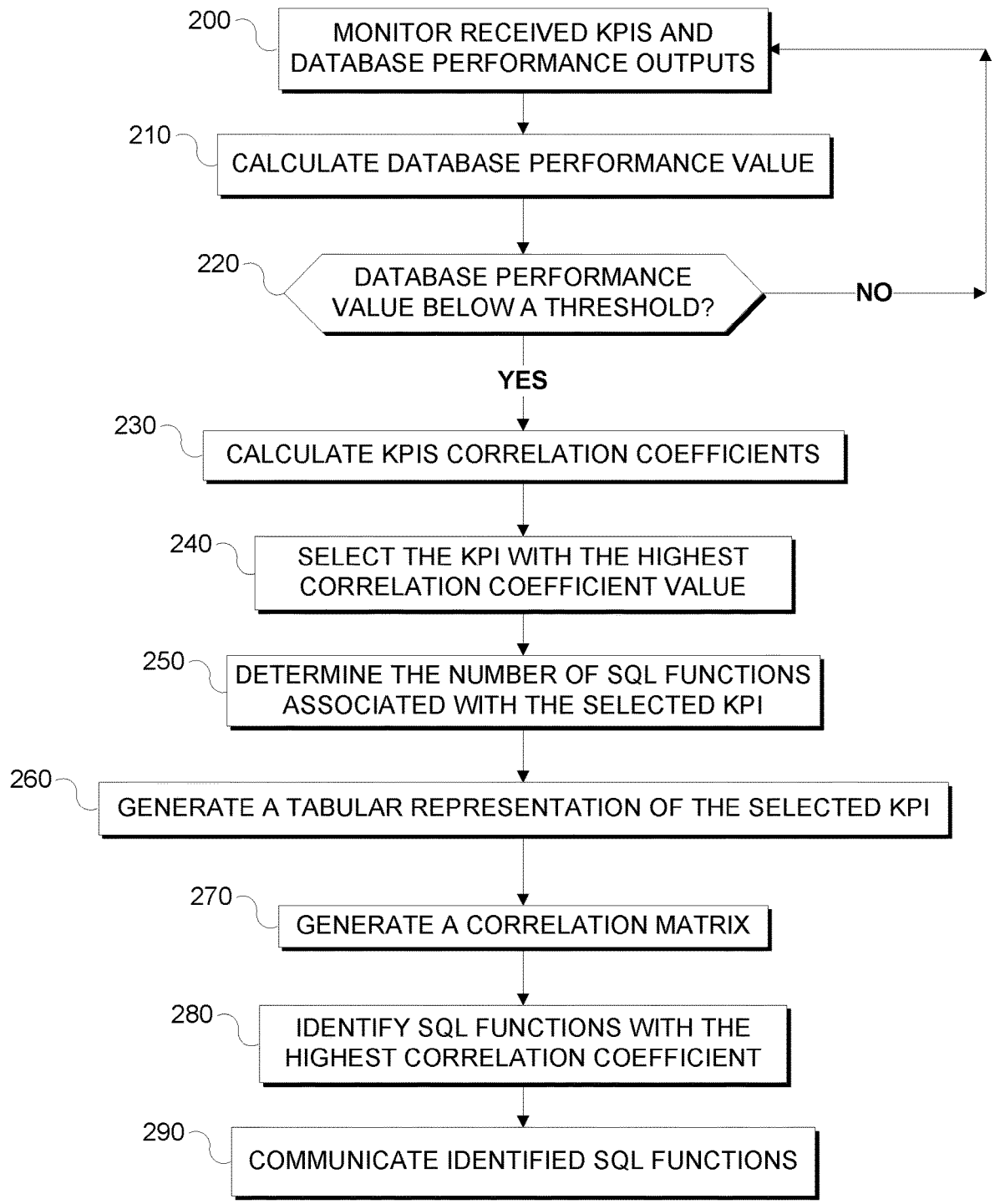
FIG. 2 is a flowchart depicting operational steps of a server computer within the distributed data processing environment of FIG. 1, in accordance with an embodiment of the present invention.

FIG. 2 is a flowchart depicting operational steps of a program executed on a server computer within the distributed data processing environment of FIG. 1, in accordance with an embodiment of the present invention. According to FIGS. 1 and 2, in step 200, receiving module 111 receives KPIs and database performance outputs from, for example, database 120. The received KPIs may be predetermined by an administrator, identified by database 120, or representative or one or more KPIs on database 120. KPIs received by receiving module 111 may be monitored at a plurality of intervals, with a predetermined or determined and periodic duration in which all intervals are of the same duration within a monitored time frame. In various embodiments, additional monitoring sessions may occur where the time intervals have varying duration. The time stamps of the monitored intervals may be stored in memory via server 110. Receiving module 111 may associate one or more functions or SQLs with the received KPIs. Where the SQLs contained in a KPI represent SQLs executed during the time of the associate KPI. Receiving module 111 communicates the received KPIs and database outputs to database correlation module 112.

In step 210, database correlation module 112 calculates a database performance value based on the database outputs and monitored KPIs within a time interval. The database performance value represents the overall performance of, for example, database 120 during a given time interval. In various embodiments, database performance values calculated during a time interval may be based on database outputs measured in that same time interval or relative to other time intervals, for example, a change in performance from one time interval to the subsequent time interval. In additional embodiments database performance values may be calculated based on database outputs measured from a base value.

If the calculated database performance value is below a threshold (decision step 220 "YES" branch), database correlation module 112 calculates a KPI correlation coefficient representing a correlation between the set of KPIs and corresponding database performance values for one or more received KPIs, in step 230. If the calculated performance value is at or above a threshold (decision step 220 "NO" branch), database correlation module 112 queries database 120 via receiving module 111 for additional data.

In step 240, database correlation module 112 selects the KPI with the highest calculated correlation coefficients. In various embodiments one or more KPIs may be selected from an ordered list of KPIs and associated correlation coefficients. The top "n" number of KPIs having the highest associated correlation coefficients may be selected. Database correlation module 112 communicates the selected KPI to SLQ correlation module 113.

In step 250, SLQ correlation module 113 determines a count of functions, or the number of SQLs contained, or associated, with the received selected KPI. In various embodiments, SQL filter module 114 filters the associated SQLs if the count is at or above a threshold. Various filtering methods in the art may be utilized.

In step 260, SLQ correlation module 113 generates a tabular representation of the selected KPI. In various embodiments the tabular representation may be updated dynamically for every time interval. The generated tabular representation of the selected KPI contains columns representing the selected KPI and rows representing SQLs. In various embodiments the rows may be SQL identifications numbers and populated based on if the SQL executed during a given time interval.

In step 270, SLQ correlation module 113 generates a correlation matrix based on the generated tabular representation and the plurality of time intervals as described above. SQL correlation coefficients are calculated based on the generated correlation matrix and SQL correlation module 113 identifies the SQL with the highest associated correlation coefficient, in step 280. In various embodiments one or more SQLs may be identified. SQL correlation module 113 communicated the identified SQLs to static mapping module 115.

Static mapping module 115 maps the identified SQLs to the associated KPI for a given time interval and communicated the mapped SQL and KPI to presentation module 116 for display to a user, in step 290.

Figure 3:
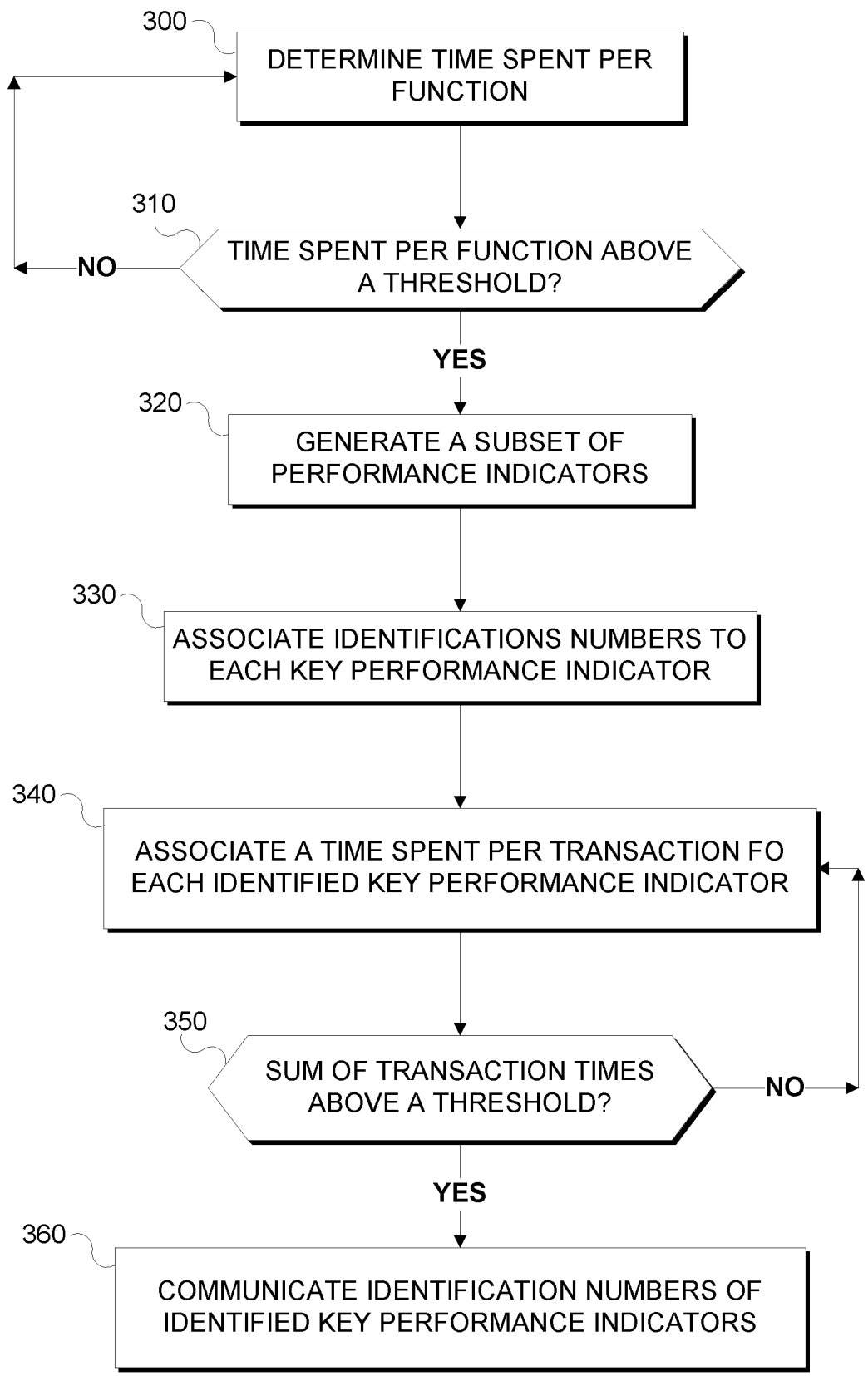
FIG. 3 is a flowchart depicting operational steps of a server computer within the distributed data processing environment of FIG. 1, in accordance with an embodiment of the present invention.

FIG. 3 is a flowchart depicting operational steps of a program executed on a server computer within the distributed data processing environment of FIG. 1, in accordance with an embodiment of the present invention. In reference to FIGS. 1 and 3, receiving module 111 receives key performance indicators and associated metadata from database 120 in order to determine time spent per KPI based on the execution of SQLs or functions during a monitored time interval, in step 300. In various embodiments time spent per KPI at a system wide level may be predetermined and included with the metadata associated with received KPIs.

Receiving module 111 communicates the received KPIs, associated metadata, and time spent data to database correlation module 112. Database correlation module 112 generates a subset of KPI, in step 320 if the time spent per transaction associated with a KPI is above a threshold, in decision step 310 "YES" branch. If the time spent per transaction is below a threshold, in decision step 310 "NO" branch, database correlation module 112 queries receiving module 111 periodically to monitor for more received KPI. Database correlation module 112 communicates the subset of data and KPI to SQL correlation module 113.

In step 330, SQL correlation module 113 associates identification number to the SQLs associated with the received KPI with time per transaction values above a threshold, for example, SQL IDs. Each identification number is based on a received time spent per transaction, in step 340 and communicated to SQL filter module 114. SQL filter module 114 communicates the SQLs, SQL IDs, and the time spent per transaction values to static mapping module 115.

SQL filter module 114 determines the sum of the threshold value and time spent per transaction value for each received SQL IDs and if the sum is above a threshold (decision step 350 "YES" branch), SQL filter module 114 communicates the SQL IDs and associated KPI to static mapping module 115, a user, or data store in memory for further processing, in step 360. If the sum is below a threshold, in decision step 350 "NO" branch, SQL filter module 114 will periodically query SQL correlation module 113 for additional SQLs.

Figure 4:
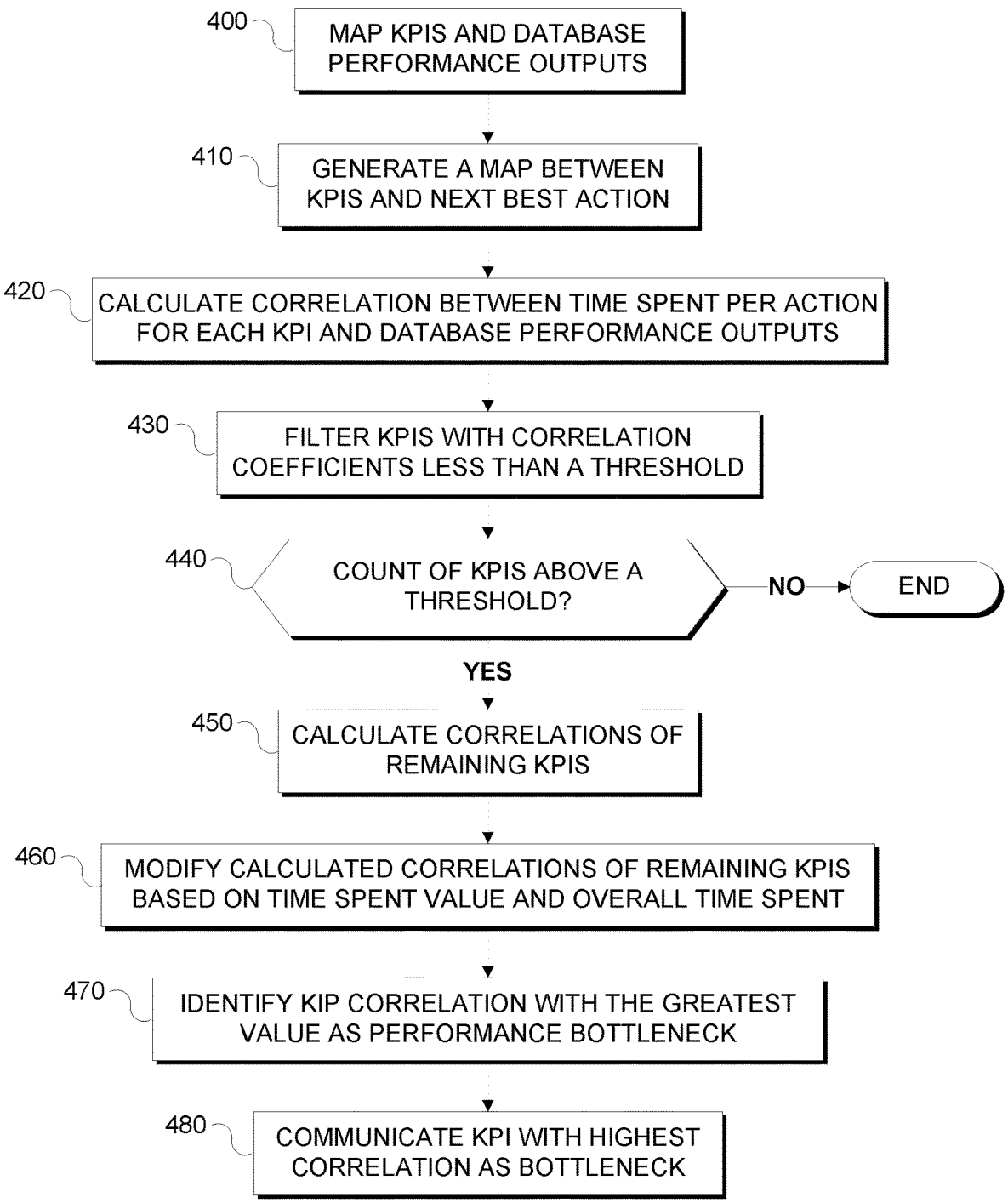
FIG. 4 is a flowchart depicting operations steps of performing weighted correlations within the distributed data processing environment of FIG. 1, in accordance with an embodiment of the present invention.

FIG. 4 is a flowchart depicting operations steps of performing weighted correlations within the distributed data processing environment of FIG. 1, in accordance with an embodiment of the present invention. In reference to FIGS. 1 and 4, in various embodiments of the present invention, static mapping module 115 may receive KPI and database performance output data from receiving module 111. In step 400, static mapping module 115 maps KPIs and database performance outputs. In step 410, static mapping module 115 maps KPIs and next best actions. In various embodiments, next best actions may be received from, for example, database 120 via receiving module 111, where the metadata for a given KPI includes the next best action for the given KPI if the given KPI is determined to contain a SQL or function with the highest correlation coefficient. Static mapping module 115 may communicate the mapped data to database correlation module 112.

In step 420, database correlation module 112 calculated the correlation coefficient based on time spend per function, transaction, or action, for each received mapped KPI. Database correlation module 112 filters KPIs with a correlation coefficient below a threshold, in step 430, as that indicates a KPI has an indeterminate effect on the performance. If a count of KPIs to pass the filtering performed in step 430 is above a threshold (decision step 440 "YES" branch) database correlation module 112 calculates the correlation coefficients of the filtered KPIs, in step 450. If the number of KPIs determined in a count of filtered KPIs is below a threshold the process ends as an indication that the monitored KPIs in the analyzed time interval are not correlated to the database performance output or database performance value.

In step 460, database correlation module 112 modifies the calculated correlation coefficients of the filtered KPIs with a weight modifying value based on the time spent to execute the functions contained in the KPI compared to the total executions during a monitored time interval.

In step 470, database correlation module 112 identifies the KPI with the correlation coefficient with the greatest value as described above and, in various embodiments, the identified one or more KPI(s) may be labeled as "bottleneck" or target KPIs and communicated to presentation module 116 for display to a user or stored in memory, for example, in a memory store on server 110, in step 480.

In various embodiments, the operational steps in FIG. 4 may be repeated for the SQLs associated with the KPI identified in step 470. According to this embodiment presentation module 116 would communicate the identified one or more SQL(s) with a calculated weighted correlation coefficient with the greatest value as described above.

While functions of the operational steps in FIGS. 2-4 are described in connection with various modules, those in that art would appreciate that this is only for illustration purposes. For example, the above functions may be implemented by programming instructions of a computer program product or computer system and organized by any known method in the art.

Figure 5:
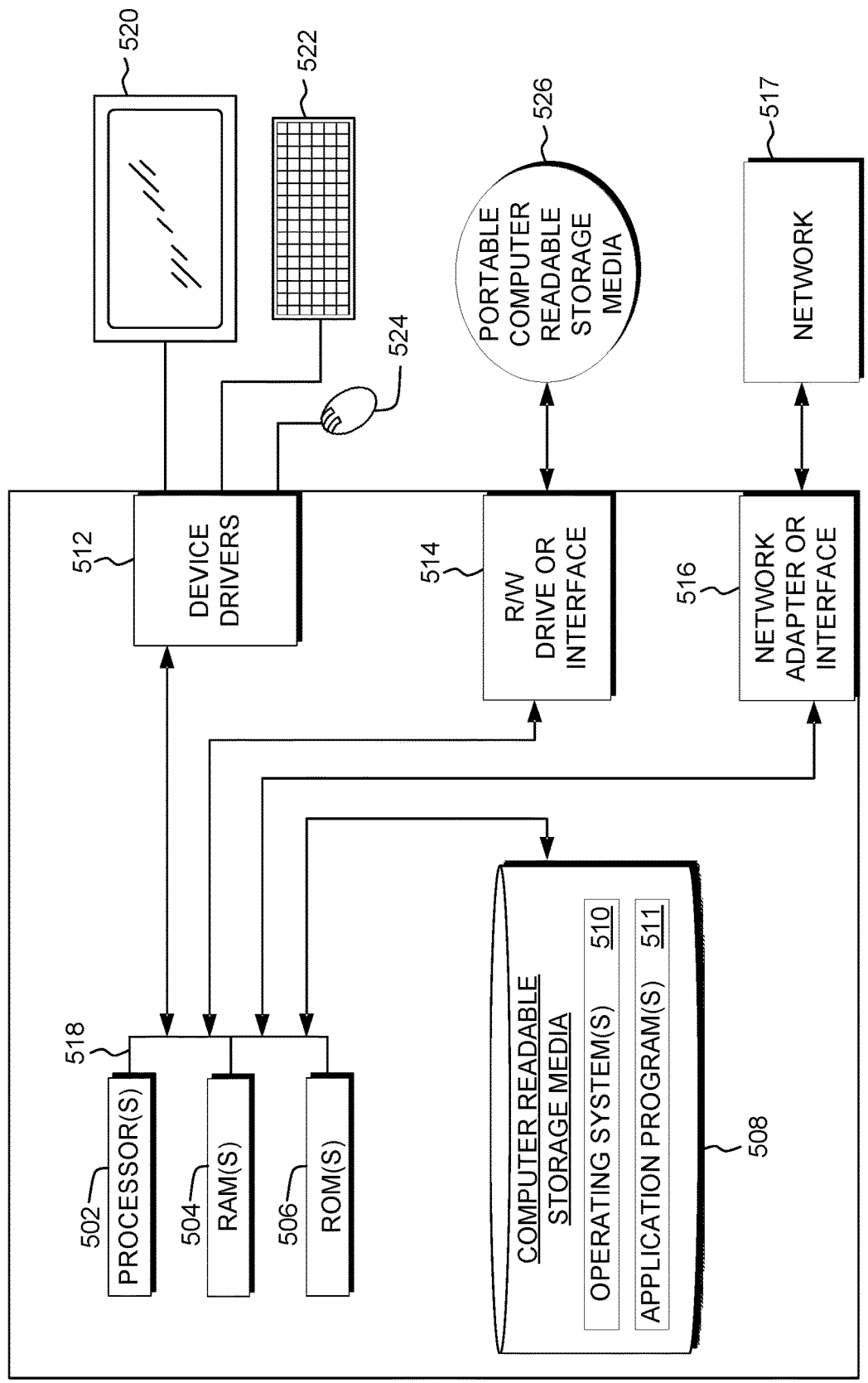
FIG. 5 depict a block diagram of components of an exemplary computing device, in accordance with an embodiment of the present invention.

FIG. 5 depicts a block diagram of components of server 110 of distributed data processing environment 100 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Server 110 may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511 are stored on one or more of the computer readable storage media 508 for execution by one or more of the processors 502 via one or more of the respective RAMs 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 110 may also include a R/W drive or interface 514 to read from and write to one or more portable computer readable storage media 526. Application programs 511 on server 110 may be stored on one or more of the portable computer readable storage media 526, read via the respective R/W drive or interface 514 and loaded into the respective computer readable storage media 508.

Server 110 may also include a network adapter or interface 516, such as a TCP/IP adapter card or wireless communication adapter (such as a 4G wireless communication adapter using OFDMA technology) for connection to a network 517. Application programs 511 on server 110 may be downloaded to the computing device from an external computer or external storage device via a network (for example, the Internet, a local area network or other wide area network or wireless network) and network adapter or interface 516. From the network adapter or interface 516, the programs may be loaded onto computer readable storage media 508. The network may comprise copper wires, optical fibers, wireless transmission, routers, firewalls, switches, gateway computers and/or edge servers.

Server 110 may also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514 and network adapter or interface 516 may comprise hardware and software (stored on computer readable storage media 508 and/or ROM 506).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for identifying a computer performance bottleneck, wherein the computer performance bottleneck is a root cause and performance degradation during a root cause analysis (RCA) by analyzing performance of a computer system based on key performance indicators (KPIs), the method comprising:
   at a plurality of time intervals, monitoring a set of KPIs of a database and database performance outputs, wherein a KPI is associated with execution of one or more functions; calculating a database performance value based on the monitored KPIs and one or more database performance outputs;

in response to determining the database performance value is below a first threshold, calculating a KPI correlation coefficient representing a correlation between the set of KPIs and corresponding database performance values;

selecting the calculated KPI correlation coefficient with the greatest value as a target KPI;

in response to determining that a count of functions of the target KPI meets a second threshold, generating a dynamic tabular representation of the determined target KPI, wherein the columns represent KPIs and the rows represent functions;

generating a correlation matrix based on the generated tabular representation and the plurality of time intervals; and identifying a first set of target functions, associated with the correlation coefficient with the greatest value, based on the generated correlation matrix; and identifying the computer performance bottleneck based on the tabular representation of the target KPI.

2. The method of claim 1, wherein determining a database performance value includes determining a database performance correlation for one or more KPIs in the set of KPIs based on a difference between the performance of the one or more KPIs in the set of KPIs and a statistical model.

3. The method of claim 1, further comprising, in response to determining a count of functions meets a third threshold, filtering a top count of functions based on the generating a dynamic tabular representation of the determined target KPI.

4. The method of claim 1, wherein generating a correlation matrix further comprises:

mapping the one or more functions of the target KPI and a corresponding time interval in which the one or more functions were executed; and calculating a Pearson product-moment correlation coefficient for the one or more mapped functions.

5. The method of claim 4, wherein identifying a first set of target functions further comprises:

determining one or more target functions based on one or more mapped functions with associated Pearson product-moment correlation coefficients of the highest value.

6. The method of claim 5, further comprising:

calculating a time spent value for the one or more functions of the target KPI;

calculating a correlation weight value for the one or more functions, wherein the correlation weight value is based on the time spent value and the monitored time interval; and determining a second set of one or more target function based on the calculated correlation weight and the generated correlation matrix.

7. The method of claim 1, wherein the database performance outputs are based on one or more of network bandwidth use, computer processor resource use, memory resource use, and disk use.

8. The method of claim 1, wherein the generated correlation matrix is generated via JOIN function.

9. The method of claim 1, further comprising: generating a graphical representation of the first set of target functions and the target KPI.

10. The method of claim 1, wherein the generated tabular representation contains columns and rows, wherein the columns contain labels based on the target KPI and the rows contain labels based on the one or more functions of the target KPI.

11. A computer program product for identifying a computer performance bottleneck, wherein the computer performance bottleneck is a root cause and performance degradation during a root cause analysis (RCA) by analyzing performance of a computer system based on key performance indicators (KPIs), the computer program product comprising:

one or more computer-readable storage media and program instructions stored on the one or more computer-readable storage media, the program instructions comprising:

at a plurality of time intervals, instructions to monitor a set of KPIs of a database and database performance outputs, wherein a KPI is associated with execution of one or more functions;

instructions to calculate a database performance value based on the monitored KPIs and one or more database performance outputs;

in response to instructions to determine the database performance value is below a first threshold, instructions to calculate a KPI correlation coefficient representing a correlation between the set of KPIs and corresponding database performance values;

instructions to select the calculated KPI correlation coefficient with the greatest value as a target KPI;

in response to instructions to determine that a count of functions of the target KPI meets a second threshold, instructions to generate a dynamic tabular representation of the determined target KPI, wherein the columns represent KPIs and the rows represent functions;

instructions to generate a correlation matrix based on the generated tabular representation and the plurality of time intervals; and instructions to identify a first set of target functions, associated with the correlation coefficient with the greatest value, based on the generated correlation matrix; and instructions to identify the computer performance bottleneck based on the tabular representation of the target KPI.

12. The computer program product of claim 11, wherein instructions to determine a database performance value includes instructions to determine a database performance correlation for one or more KPIs in the set of KPIs based on a difference between the performance of the one or more KPIs in the set of KPIs and a statistical model.

13. The computer program product of claim 11, further comprising, in response to instructions to determine a count of functions meets a third threshold, instructions to filter a top count of functions based on the instructions to generate a dynamic tabular representation of the determined target KPI.

14. The computer program product of claim 11, wherein instructions to generate a correlation matrix further comprises:

instructions to map the one or more functions of the target KPI and a corresponding time interval in which the one or more functions were executed; and instructions to calculate a Pearson product-moment correlation coefficient for the one or more mapped functions.

15. The computer program product of claim 14, wherein instructions to identify a first set of target functions further comprises:

instructions to determine one or more target functions based on one or more mapped functions with associated Pearson product-moment correlation coefficients of the highest value.

16. The computer program product of claim 15, further comprising:
   instructions to calculate a time spent value for the one or more functions of the target KPI;
   instructions to calculate a correlation weight value for the one or more functions, wherein the correlation weight value is based on the time spent value and the monitored time interval; and
   instructions to determine a second set of one or more target function based on the calculated correlation weight and the generated correlation matrix.

17. The computer program product of claim 11, wherein the database performance outputs are based on one or more of network bandwidth use, computer processor resource use, memory resource use, and disk use.

18. The computer program product of claim 11, wherein the generated correlation matrix is generated via JOIN function.

19. The computer program product of claim 11, further comprising: instructions to generate a graphical representation of the first set of target functions and the target KPI.

20. A computer system for identifying a computer performance bottleneck, wherein the computer performance bottleneck is a root cause and performance degradation during a root cause analysis (RCA) by analyzing performance of a computer system based on key performance indicators (KPIs), the computer system comprising:
   one or more computer processors;
   one or more computer-readable storage media;
   program instructions stored on the computer-readable storage media for execution by at least one of the one or more processors, the program instructions comprising:
   at a plurality of time intervals, instructions to monitor a set of KPIs of a database and database performance outputs, wherein a KPI is associated with execution of one or more functions;
   instructions to calculate a database performance value based on the monitored KPIs and one or more database performance outputs;
   in response to instructions to determine the database performance value is below a first threshold, instructions to calculate a KPI correlation coefficient representing a correlation between the set of KPIs and corresponding database performance values;
   instructions to select the calculated KPI correlation coefficient with the greatest value as a target KPI;
   in response to instructions to determine that a count of functions of the target KPI meets a second threshold, instructions to generate a dynamic tabular representation of the determined target KPI, wherein the columns represent KPIs and the rows represent functions;
   instructions to generate a correlation matrix based on the generated tabular representation and the plurality of time intervals; and
   instructions to identify a first set of target functions, associated with the correlation coefficient with the greatest value, based on the generated correlation matrix; and
   instructions to identify the computer performance bottleneck based on the tabular representation of the target KPI.

* * * * *